United States Patent
Chang

(10) Patent No.: US 8,596,856 B2
(45) Date of Patent: Dec. 3, 2013

(54) COUNTER-ROTATING TWIN SCREW EXTRUDER

(76) Inventor: Shuo-Chih Chang, Yilan County (TW)

( * ) Notice: Subject to any disclaimer, the term of this patent is extended or adjusted under 35 U.S.C. 154(b) by 945 days.

(21) Appl. No.: 12/633,103

(22) Filed: Dec. 8, 2009

(65) Prior Publication Data

US 2010/0143523 A1 Jun. 10, 2010

(30) Foreign Application Priority Data

Dec. 10, 2008 (TW) ................................. 97222157 U

(51) Int. Cl.
- *B28C 1/16* (2006.01)
- *B29B 7/48* (2006.01)
- *B29B 7/58* (2006.01)
- *A21C 1/00* (2006.01)

(52) U.S. Cl.
USPC ............................ 366/84; 366/100; 366/296

(58) Field of Classification Search
USPC ........... 366/83, 84, 85, 86, 90, 100, 296, 321, 366/324
See application file for complete search history.

(56) References Cited

U.S. PATENT DOCUMENTS

| | | | | | |
|---|---|---|---|---|---|
| 3,550,914 | A | * | 12/1970 | Matsuoka | 366/84 |
| 3,652,062 | A | * | 3/1972 | Baker | 366/80 |
| 3,776,529 | A | * | 12/1973 | Sutter et al. | 366/78 |
| 3,863,905 | A | * | 2/1975 | Maxwell | 425/208 |
| 4,118,164 | A | * | 10/1978 | Wenger et al. | 425/202 |
| 4,127,331 | A | * | 11/1978 | Herbert et al. | 366/83 |
| 4,408,888 | A | * | 10/1983 | Hanslik | 366/83 |
| 4,416,606 | A | * | 11/1983 | Sugano et al. | 425/202 |
| 4,773,763 | A | * | 9/1988 | Weber | 366/83 |
| 4,792,294 | A | * | 12/1988 | Mowli | 418/9 |
| 5,232,280 | A | * | 8/1993 | Moriyama | 366/83 |
| 5,641,227 | A | * | 6/1997 | Geyer | 366/78 |
| 6,149,846 | A | * | 11/2000 | Zerafati-Jahromi et al. | 264/102 |
| 6,280,074 | B1 | * | 8/2001 | Kuroda et al. | 366/76.3 |
| 6,814,481 | B2 | * | 11/2004 | Colombo | 366/80 |
| 7,296,920 | B2 | * | 11/2007 | Zhang et al. | 366/83 |
| 8,066,423 | B2 | * | 11/2011 | Neubauer | 366/77 |
| 8,079,747 | B2 | * | 12/2011 | Ek et al. | 366/80 |
| 8,132,957 | B2 | * | 3/2012 | Fukutani et al. | 366/79 |
| 2004/0197465 | A1 | * | 10/2004 | Clark et al. | 426/656 |
| 2004/0257904 | A1 | * | 12/2004 | Zhang et al. | 366/81 |
| 2006/0233938 | A1 | * | 10/2006 | Nakano et al. | 426/656 |
| 2008/0280020 | A1 | * | 11/2008 | Kugitani et al. | 426/634 |
| 2010/0091603 | A1 | * | 4/2010 | Yamane et al. | 366/85 |
| 2010/0143523 | A1 | * | 6/2010 | Chang | 425/204 |

* cited by examiner

*Primary Examiner* — Tony G Soohoo
(74) *Attorney, Agent, or Firm* — Leong C. Lei

(57) ABSTRACT

A counter-rotating twin screw extruder includes a motor that generates power through speed reduction of a gear box to directly or indirectly drive two symmetric screw shafts inside an enclosure barrel for synchronous but opposite rotations. Each screw shaft is fit with at least one section of screw and the two screws forms screw flight that are set in opposite directions and alternating each other. The barrel contains therein at least one flow restriction die. A bearing box is set between the barrel and the gear box. The purpose is to reduce unnecessarily induced mechanical energy during the conveyance of material and the advantages of using an independent bearing box are that manufacturing costs are reduced and consumption of energy is cut down. Parts wearing is reduced and durability is enhanced to eventually realize carbon reduction and energy saving.

4 Claims, 7 Drawing Sheets

COUNTER-ROTATING TWIN SCREW EXTRUDER

BACKGROUND OF THE INVENTION (a) Field of the Invention

The present invention relates to a food processing machine applicable to a slurry raw material, and more particularly to a counter-rotating twin screw extruder structure with two oppositely and alternately disposed screw blades.

(b) Description of the Prior Art

In food industry, paste-like material, such as pet food, feeds or human foods, is utilized the co-rotating twin screw extruder which can effectively heat the starch in the material, appropriately mix, and then extrude the material to form the finished products.

Referring to FIG. 1, the co-rotating twin screw extruder comprise with two symmetrical screws driven by motor either directly or indirectly in the barrel casing. The two screws can rotate synchronously in the same direction, either clockwise or counterclockwise. The screw surface set with alternating screw flight. As shown in the drawing, when the co-rotating twin-screw extruder operates, the two screws 1 are all set in clockwise rotation so that material 2 and the helical blades of the screws 1 can rub each other to generate thermal energy through mechanical friction, which continuously heats the mixed material 2 and thus enhance the material cooking by the setting. This kind of co-rotating twin-screw have been widely used in the food industry and in feed manufacturing.

However, the co-rotating twin screw extruder device has several drawbacks in the operation:

(1) Since in the design of the screws 1 of the co-rotating twin screw extruder, the two forwardly and alternately disposed screw blades convey the raw material 2 to be agitated and extruded and the heating source is the friction between the raw material 2 and the screws 1, the production of the mechanical frictional thermal energy cannot be controlled, and extra thermal energy may be produced by unnecessary mechanical friction, whereby this kind of device may not be suitable for materials that do not need heating or cannot be heated.

(2) Due to the reason set above, the conventional co-rotating twin screw extruder cannot precisely set the mechanical friction induced thermal energy inside a desired working zone and may lead to deficiencies of undesired wearing of the helical blades and increase of load of the motor (increased power consumption).

(3) The conventional co-rotating twin screw extruder employs a gear box to raise the torque induced in the rotation thereof and the gear box requires a large number of gears to ensure shafts to rotate in the same direction, so that the gear assembly is complicated and additional cost of design is needed, and the great number of gears arranged inside the gear box comparatively increases the amount of thermal energy generated, whereby extension of lifespan must be realized through an additional external cooling system, which causes additional consumption of electrical power and also increases the cost of potential maintenance.

Thus, the above discussed drawbacks of the conventional co-rotating twin screw extruder cause certain troubles to the manufacturers so that such drawbacks must be overcome.

SUMMARY OF THE INVENTION

The primary purpose of the present invention is to provide a counter-rotating twin screw extruder, which comprises at least a casing barrel, a bearing box, two symmetric screw shafts, a gear box, and a motor, wherein the motor, after subjected to speed reduction through the gear box, directly or indirectly drives the two symmetric screw shafts inside the enclosure barrel for synchronous rotation in opposite directions. Each screw shaft is fit with at least one section of screw and the two symmetric screws comprise helical blades arranged in counter directions and alternating each other. The casing barrel contains therein at least one flow restriction die, which forms at least one opening.

In operation, the synchronous but opposite rotations of the two symmetric screws are employed to drive the helical blades that are arranged on the screws in opposite directions and alternating each so as to induce a powerful compression conveyance of material inside the casing barrel, but cause minimal rubbing heat (thermal energy) between the material and the screws during the conveyance thereof. With different opening ratio (area or quantity of opening), the flow restriction die can control the material retention time between the screw and the barrel where to determine the degree of thermal energy given. This design is suit for producing the production with high fiber or high viscous raw material. Further, the present invention also allows for independent design of the gear box, the bearing box in accordance with the needs of the desired transmission for realizing individual reinforcement or strengthening to increase the performance of speed change, transmission, and thrust supporting. Thus, the novel transmission structure in accordance with the present invention effectively reduces the investment of the design cost for a gear box, which is often of a high unit price, cuts down the consumption of energy, and the flow restriction die along with counter-rotating screws alleviates wearing of parts, thereby improving overall durability and achieving carbon reduction and energy saving.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

With reference to FIGS. 2-7, the present invention provides a counter-rotating twin-screw extruder, which is composed of the following constituent components.

Figure 6:
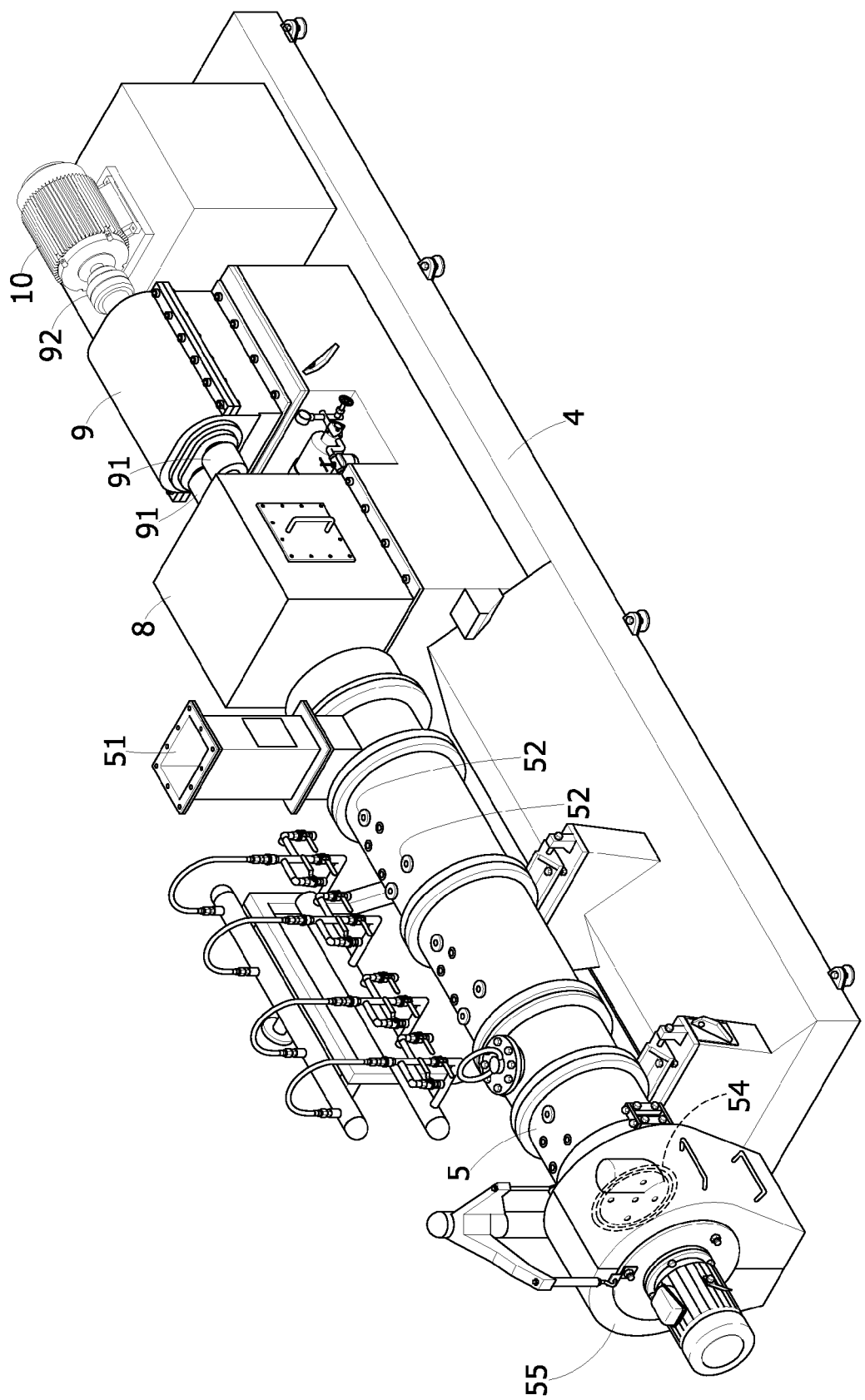
FIG. 6 is a perspective view of the preferred embodiment of the present invention.

A casing barrel 5 is mounted on a frame 4. The outer wall of the casing barrel 5 set with at least one feeder 51 in the top for adding raw material 6 or additives and several heating holes 52 (which as shown in FIG. 3 is located in the top of the casing barrel 5) for importing the high temperature steam. The end of the casing barrel 5 forms an outlet 53 equipped with a die plate 54 and a pellet cut-off device 55 (which as shown in FIG. 6 set on the left-hand side of the casing barrel 5) in outer side. By the design, the raw material 6 is extruded through the outlet 53 and molded to correspond to a shape defined by the die plate 54 and then cut off by the pellet cut-off device 55 so that the extruded material 6 is cut off to form pellets. Further, the casing barrel 5 contains therein at least one flow restriction die 56, which is set radically to divide an interior space of the casing barrel 5 into multiple working zones 57 (as shown in FIG. 3). The flow restriction die 56 forms two symmetrically arranged supporting holes 561 and at least one opening 562 (which are shown in the left-hand side of the casing barrel 5 in the drawing of FIG. 2). Further, the barrel 5 contains therein at least one steam lock 58, which prevents the high temperature steam introduced through the heating holes 52 from flowing uncontrollably among the working zones 57 so as to realize temperature control of each individual working zone 57.

Two screw shafts 7 are arranged in a symmetric manner inside the barrel 5 and respectively extend through the supporting holes 561 of the flow restriction barrel die 56. Further, each shaft 7 is provided with at least one section of screw 71 fit and fixed thereto in such a way that the flow restriction die 56 is located between two adjacent screw sections 71 of the same shaft 7. The two symmetrically arranged screws 71 associated with two shafts 7 are provided with screw flight 711 that extend in opposite directions and alternate each other (as shown in FIGS. 2 and 3), whereby one of the screws 71 comprises a clockwise-extending screw flight 711, while the other screw 71 comprises a counterclockwise-extending screw flight 711.

Figure 5:
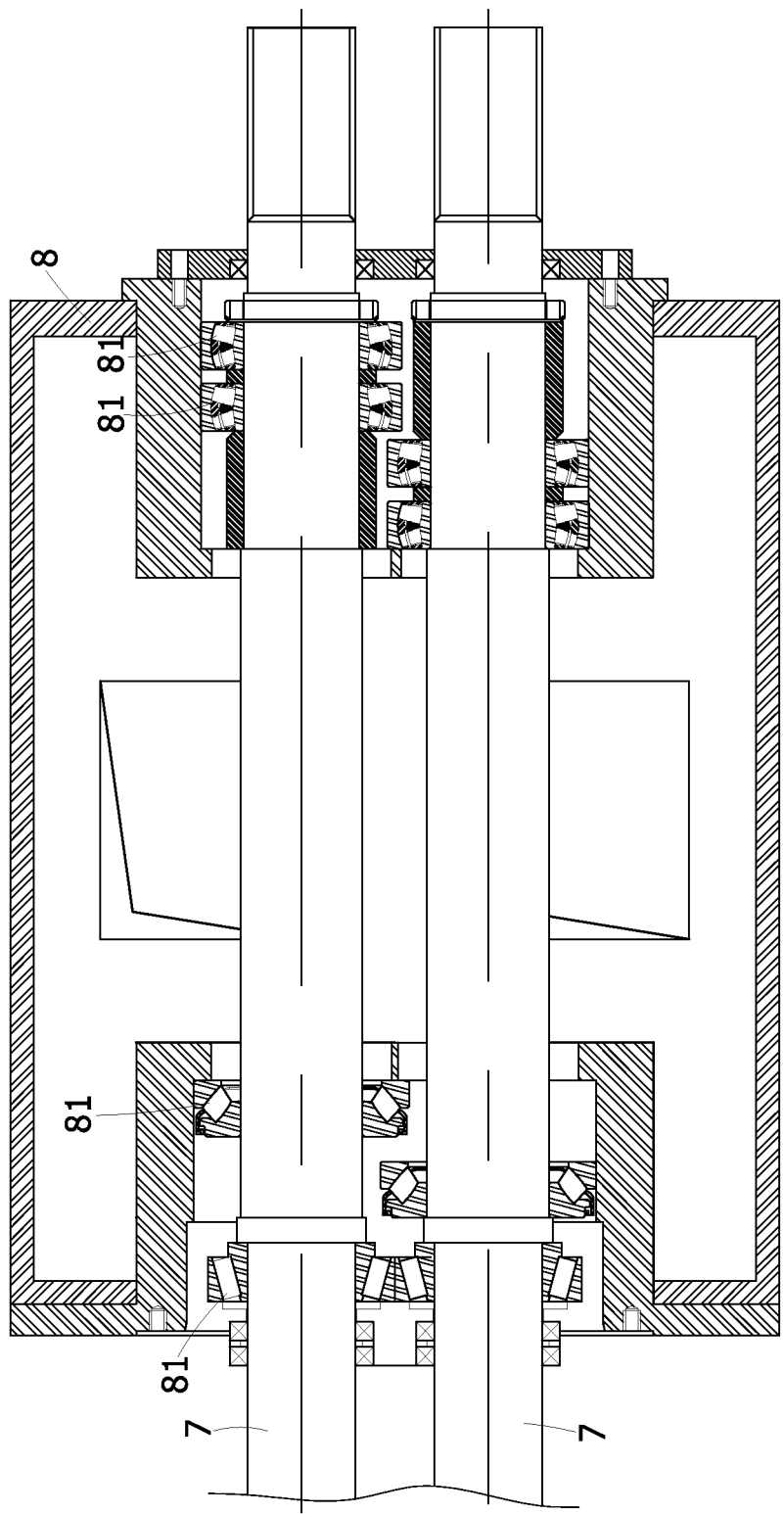
FIG. 5 is a cross-sectional view of a bearing box of the preferred embodiment of the present invention.

A bearing box 8 set at an end of the casing barrel 5 (as shown in FIG. 5) contains therein several bearing 81 that are arranged in a left-right symmetric manner. The shafts 7 are fit into the respective bearings 81 of the bearing box 8 with ends thereof for the support of the shafts 7.

Figure 2:
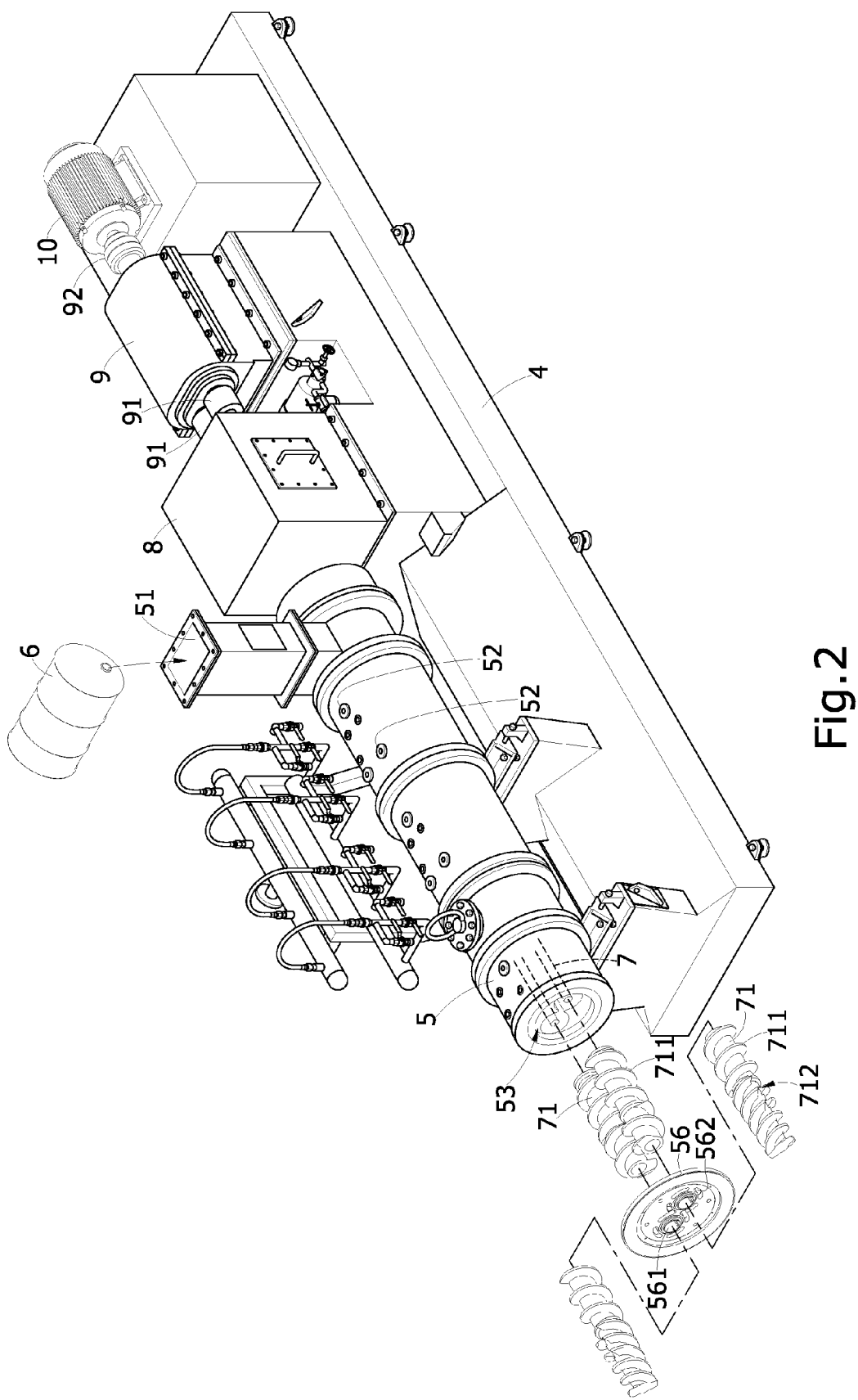
FIG. 2 is an exploded view of a preferred embodiment of the present invention.
Figure 3:
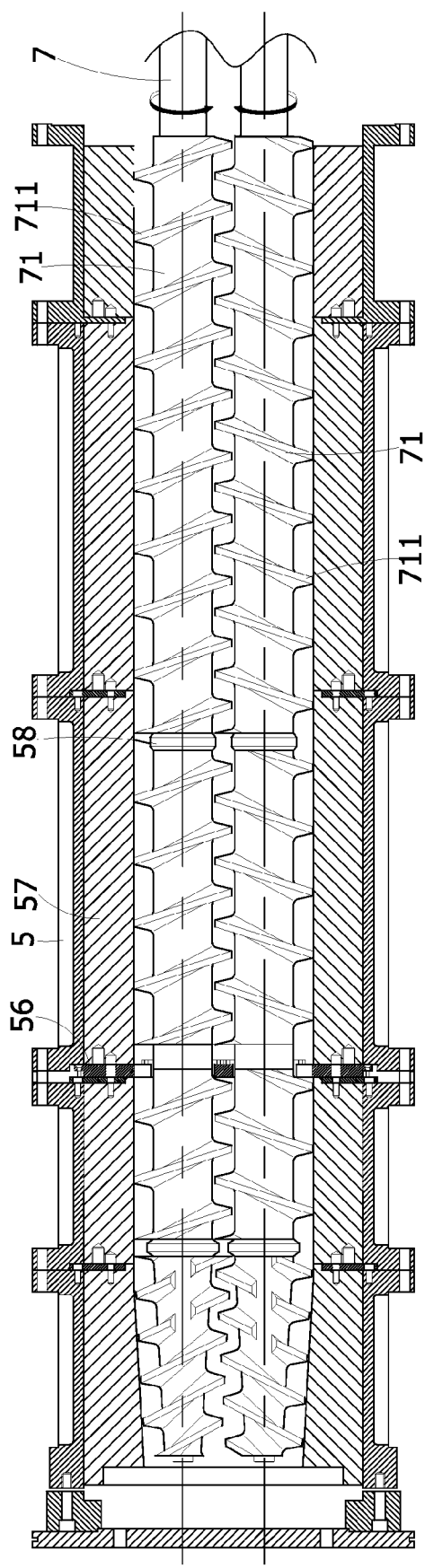
FIG. 3 is a cross-sectional view of the preferred embodiment of the present invention in an operating condition.

A gear box 9 is set at one side of the bearing box 8, as shown in FIG. 2. Opposite ends of the gear box 9 are respectively provided with two output spindles 91 and an input spindle 92. The gear box 9 contains several gears (not shown in the drawings) and power transmission from the input spindle 92 coupled through the gears to the two output spindles 91 to thereby effect speed reduction and increase of torque, and to drive the two output spindles 91 for rotation in opposite directions (namely one of the output spindles 91 rotates clockwise, while the other output spindle 91 rotates counter-clockwise). The two output spindles 91 are respectively coupled to the two shafts 7 for power transmission.

Figure 7:
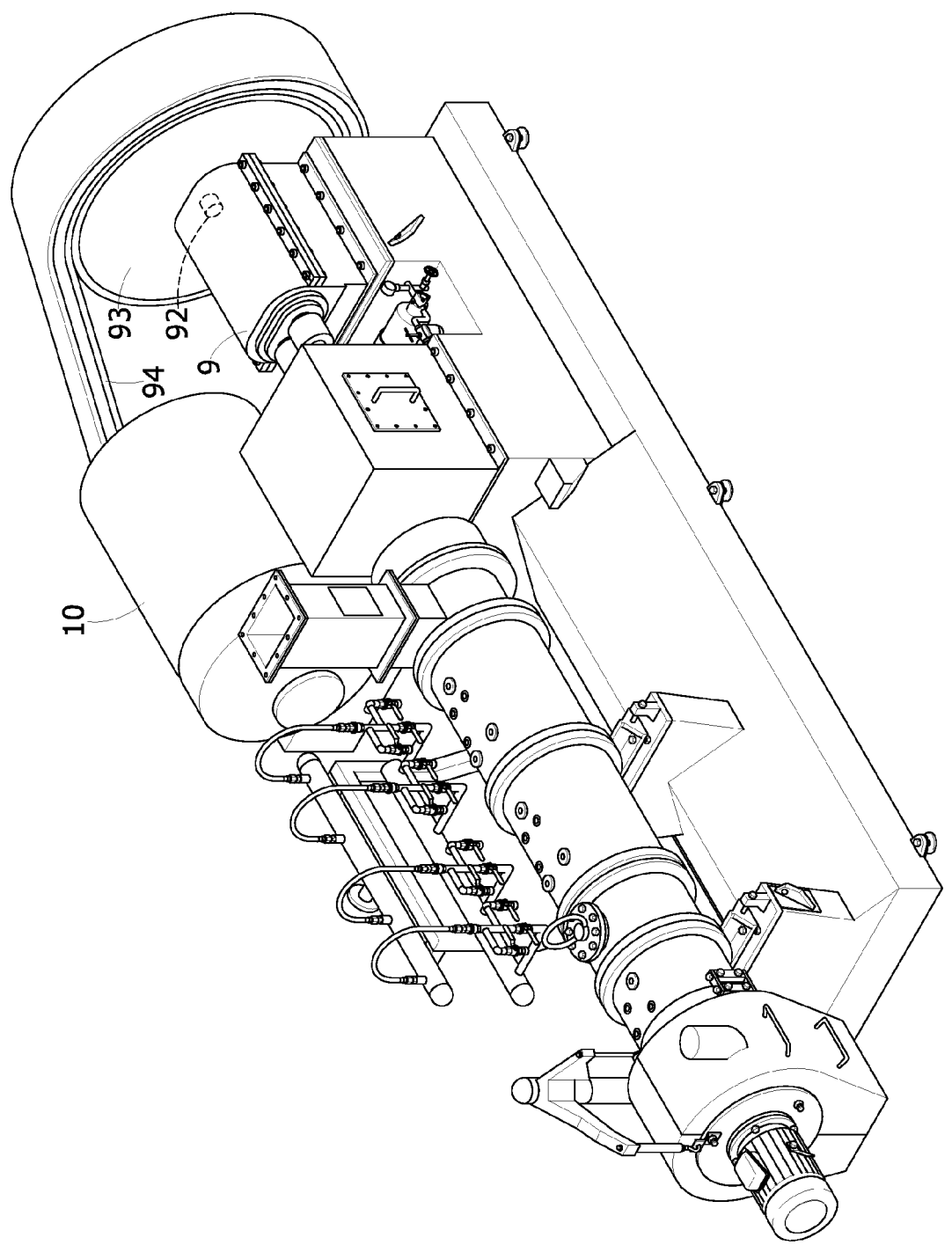
FIG. 7 is a perspective view of another embodiment of the present invention.

A motor 10 is set by one side of the gear box 9 and is directly coupled to the input spindle 92 of the gear box 9 for power transmission (as shown in FIG. 6). Alternatively, the input spindle 92 of the gear box is provided with a V-belt pulley 93 and a V-belt 94 is coupled to the pulley 93 to establish a speed-reduction coupling between the motor 10 and the gear box 9 (as shown in FIG. 7).

Figure 1:
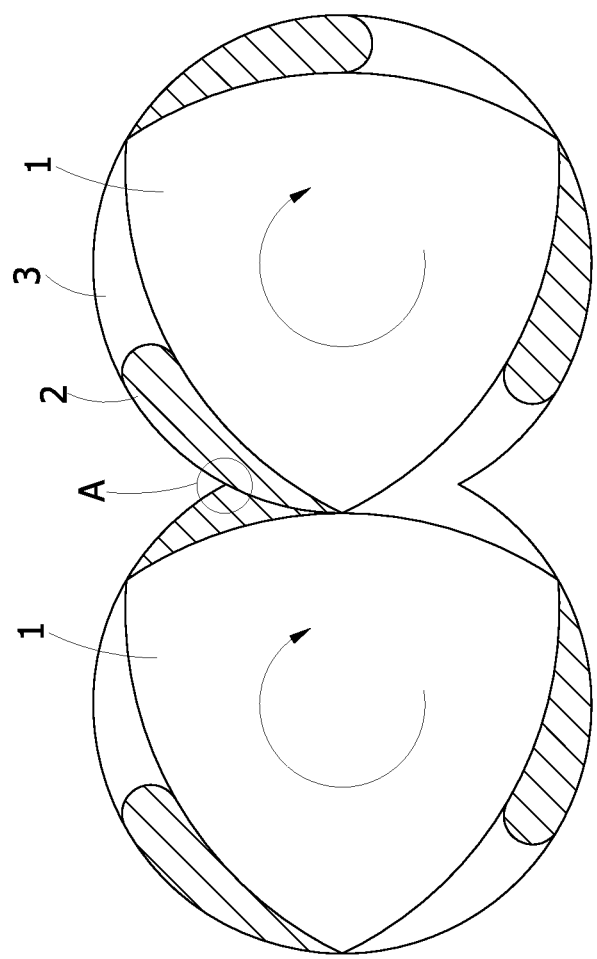
FIG. 1 is a cross-sectional view illustrating the operation of a conventional co-rotating twin screw extruder.
Figure 4:
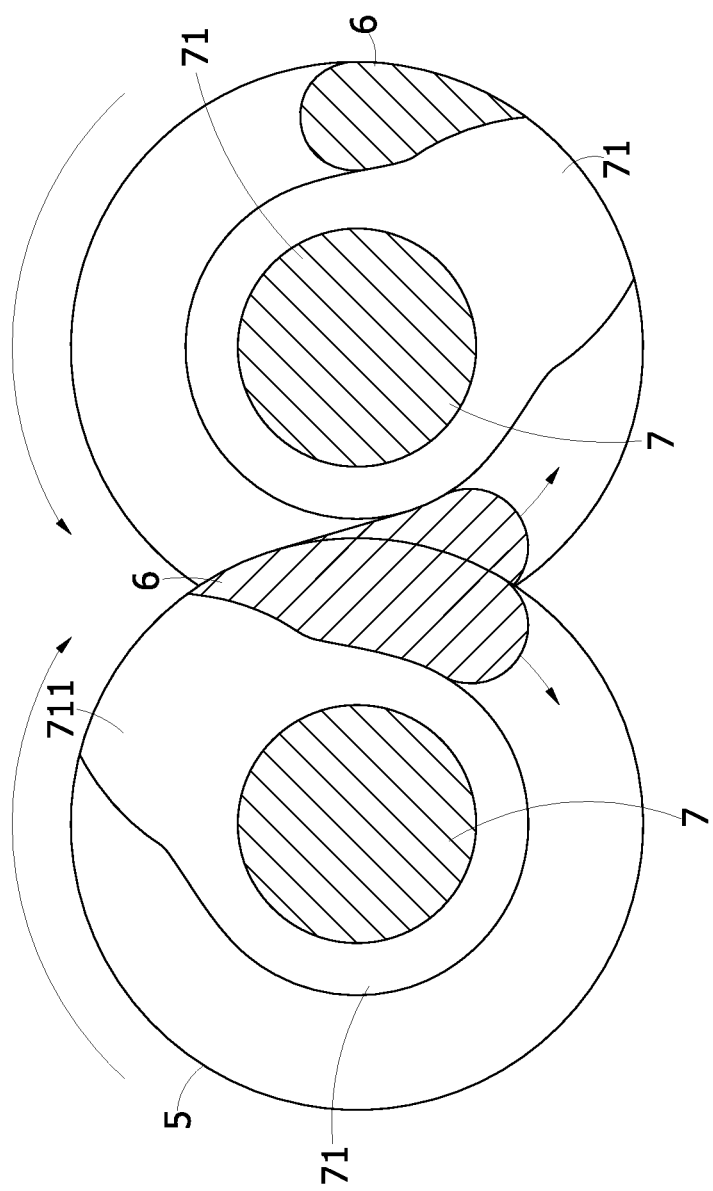
FIG. 4 is a cross-sectional view illustrating the operation of the preferred embodiment of the present invention.

As shown in FIGS. 3 and 4, in operation, the direction-opposite screw flight 711 mounted to the symmetrically arranged shafts 7 are driven by the motor 10 (as shown in FIG. 2) to make synchronous but opposite rotation. The screw flight 711 forms a sufficient accommodation space with respect to an inside wall of the barrel 5, so that the raw material 6 that is fed through the feeder 51 of the barrel 5 is continuously dragged by the screw flight 711 until reaching the outlet 53. Thus, the raw material 6 is conveyed forward by being compressed between the screw flights 711. Further, as compared to the conventional co-rotating twin-screw extruder that performs single direction rubbing against inner wall to effect kneading and conveying of raw material 2 through rubbing between the raw material 2 and an enclosure barrel 3 (see FIG. 1), the present invention effects compression conveyance in such a way that the raw materials is centrally concentrated and forced toward the center of the screws 71, whereby the raw material is subjected to pressurized concentration during the conveyance with even feeding rate thereof, which produces pellets of substantially the same size.

Further, during the conveyance of the raw material 6, the synchronous and opposite rotations of the two shafts 7 that are carried out in inward directions make the screw flight 711 of the screws 71 to perform synchronous and inward rotations, so as to continuously subject the raw material 6 to flow separated, compressed and conveyed within the barrel 5. Thus, unnecessary generation of heat from rubbing is eliminated and better performance of compression conveyance is realized for improving throughput. Compared to the co-rotating twin-screw extruder of the same capacity, the present invention adopts screws 71 of relatively small diameter and motor 10 of relatively low power, so that the manufacturing cost is reduced and the heat generated by rubbing is significantly reduced, thereby extending the lifespan of the screws 71. Further, the screw flight 711 form several of notches or cutoffs 712 (as illustrated in the screw flight 711 of the left screw 71 shown in FIG. 2), whereby the raw material 6 may flow backward through the notches 712 to extend the retention time when the raw material 6 stays inside the barrel 5. The barrel 5 is made of a material that is not easy to induce a friction force to ensure no high temperature that will be generated during the compression of the raw material. This is particularly suitable a raw material 6 containing heat sensitive ingredients so as to protect the ingredients of the raw material 6 from being damaged.

As shown in FIG. 3, the flow restriction dies 56 set inside the barrel 5 divide the interior space of the barrel 5 into multiple working zones 57 and the flow restriction dies 56 form openings 562 of various counts (as shown in FIG. 2). Due to the various opening rate of different flow restriction die 56, when the raw material 6 stays in each working zone 57, the time period can be controlled and changed and eventually the degree of mixture and furthermore setting of the raw material 6 in the compression conveyance can be controlled. Further, each working zone 57 is provided with a steam lock 58 to prevent back flow of steam (as shown in FIG. 3) in order to precisely control the temperature of each working zone and also provide the retention time of the raw material 6.

As shown in FIG. 2, the present invention in accordance with the bearing box 8, the gear box 9, and the barrel 5 are independent individual sub-assemblies, so that reinforcement can be made individually in respect of transmission and thrust supporting and simplification of gear arrangement inside the gear box 9 independently made to reduce the costs of manufacturing and design. Further, the low friction heat design of the shafts 7 enhances the durability of the transmission system without adding a circulation system of coolant, so that the costs of subsequent maintenance and the costs of energy for operation are both reduced. Since the general causes for the failure of the conventional co-rotating twin-screw extruder devices is focused on the gear box. Because the shafts induce significant vibration during the high speed rotation which easily leads to breaking of the bearings set inside the gear box for supporting purposes. On the contrary, the simplified design of the gear box 9 in accordance with the present invention is coupled to a tough-designed bearing box 8 that contains therein several large-sized bearing 81 (see FIG. 5) for supporting and bearing the vibration force induced by the shafts 7 so that the gear box 9 is indirectly protected by the bearing box 8 and the lifespan of the gear box 9 is substantially extended.

As shown in FIG. 7, when subjected to limitation of space or due to a desired arrangement of the motor 10, the power transmission system of the present invention can be modified to incorporate a V-belt 94 to the motor 10 and a V-belt pulley 93 mounted to the input spindle 92 of the gear box 9. Since the V-belt pulley 93 can be different dimensions, the output of rotational speed of the motor 10 can be changed as desired. Compared to the conventional transmission system using a direct-current motor combined with electric control device or an alternate-current motor with an inverter, the present invention allows for substantial cut-down of manufacturing costs, maintenance costs, and energy costs.

As discussed above, when put into practice, the present invention offers the following advantages:

(1) As shown in FIG. 2-7, the barrel 5 of the present invention contains therein two symmetrically arranged shafts 7, which are rotated synchronously but in opposite directions, and each is fit with at least one screw 71 in such a way that the two screws 71 comprise screw flight 711 extending in opposite directions and alternating each other, a flow restriction die 56 being arranged between adjacent screws 71, so that in operation, the raw material 6 is subjected to powerful compression conveyance to enhance degree of mixture and ripening.

(2) Further, since the present invention arranges a flow restriction die 56 between the screws 71 and since the flow restriction die 56 forms several openings 562, the retention time can be selected by properly setting the opening rate of the flow restriction die 56 when the raw material 6 stays in the extrusion device.

(3) The barrel 5 of the present invention contains therein several flow restriction dies 56 and steam locks 58 in which steam is introduced through heating holes 52 into the barrel 5 to carry out sectioned heating to thereby enhance practicability of the use of the extrusion device.

While certain novel features of this invention have been shown and described and are pointed out in the annexed claim, it is not intended to be limited to the detailed above, substitutions and changes in the forms and details of the device illustrated and in its operation can be made by those skilled in the art without departing in any way from the spirit of the present invention.

What is claimed is:

1. A counter-rotating twin screw extruder, at least comprising:
    a casing barrel, which is mounted on a frame and has a feeder and a plurality of heating holes formed at one side thereof, the casing barrel having an end that forms an outlet;
    two screw shafts, which are arranged in a symmetric manner to extend through the outlet of the casing barrel, each screw shaft comprising one section of screw, the screws of the screw shafts comprising screw flights that are arranged in opposite directions;
    a motor, which is arranged to supply power, directly or indirectly, to the two screw shafts;
    characterized in that:
    a gear box and a bearing box, which are independent of each other and are arranged in transmission between the motor and the screw shafts, the gear box having an end provided with an input spindle coupled to the motor and an opposite end that is coupled, after through speed reduction with a plurality of gears, to two output spindles for rotations in opposite directions and to further extend the bearing box to respectively coupled to the two screw shafts, the bearing box containing therein a plurality of bearings and providing vibration protection for the shafts; and
    a flow restriction die, which is set inside the casing barrel, the flow restriction die forming two symmetrically arranged supporting holes and a plurality of openings distributed around the supporting holes, wherein the shafts respectively extend through the support holes.

2. The counter-rotating twin screw extruder according to claim 1, wherein one side of the outlet is provided with a die plate that comprises molding holes and an outer side of the die plate is provided with a scraping blade to constitute a pellet cut-off device.

3. The counter-rotating twin screw extruder according to claim 1, wherein the flow restriction die is located between two adjacent sections of the screw of each shaft.

4. The counter-rotating twin screw extruder according to claim 1, wherein the flow restriction die is set between a final section of the screw of each shaft and the outlet.

* * * * *